March 4, 1969  R. O. ALDER ET AL  3,430,405
THERMAL PROTECTION ARRANGEMENT AND ELEMENT THEREFOR
Filed Sept. 12, 1966
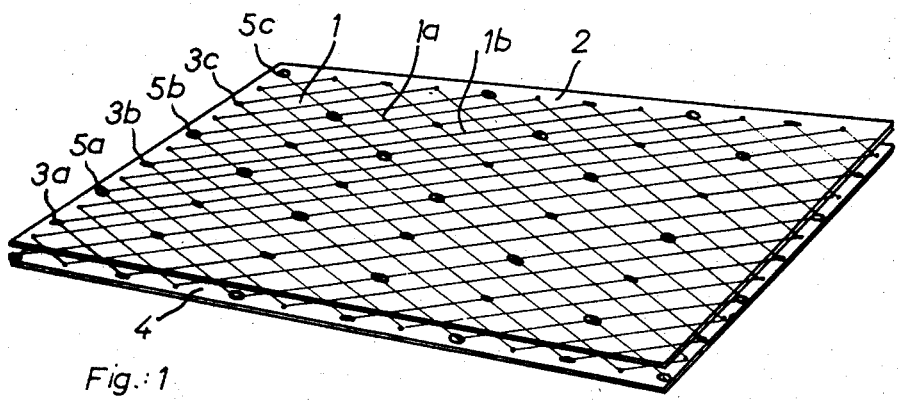
Fig.:1
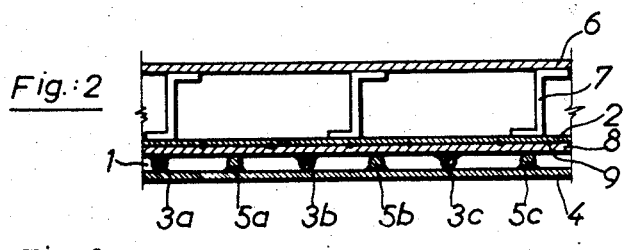
Fig.:2
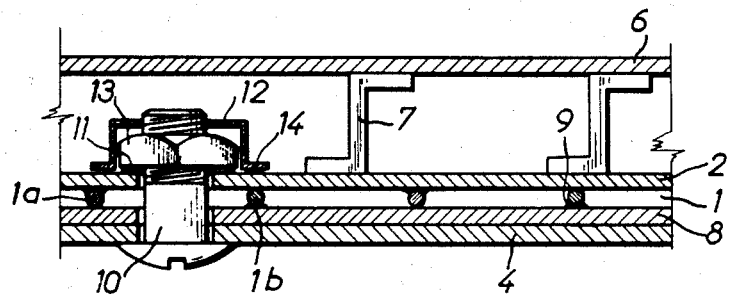
Fig.:3
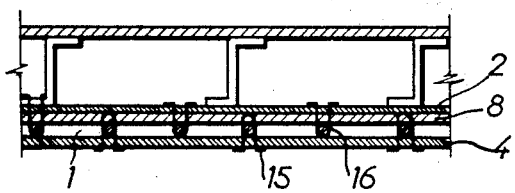
Fig.:4
Inventors:
Robert Oscar Alder
Roger Jean François Baudet
Claude Paul Baudier
Michelle Marcelle Grosset
By Watson, Cole, Grindle + Watson
Attorneys

United States Patent Office 3,430,405
Patented Mar. 4, 1969

3,430,405
THERMAL PROTECTION ARRANGEMENT AND ELEMENT THEREFOR
Robert Oscar Alder, Talence, Roger Jean Francois Baudet, La Courneuve, Claude Paul Baudier, Bordeaux Cauderan, and Michelle Marcelle Gasset, Villeneuve-St-Georges, France, assignors to Societe Nationale d'Etude et de Construction de Moteurs d'Aviation, Paris, France, a company of France
Filed Sept. 12, 1966, Ser. No. 578,871
Claims priority, application France, Sept. 14, 1965, 31,380
U.S. Cl. 52—573          3 Claims
Int. Cl. E04b *1/68, 1/98, 2/28*

ABSTRACT OF THE DISCLOSURE

A thermal protection arrangement for a structure to be protected against a high temperature heat source, comprising a protective plate disposed between the heat source and the structure to be protected, and a substantially flat metallic wire-netting disposed between the protective plate and the heat strucure, the wires of which netting intersect in the "warp and weft" fashion of a fabric, some of the intersections of some parallel wires being fixed to the structure to be protected, and some of the intersections of some other wires parallel and non-adjacent to said first wires being fixed to the protective plate, relative movements of the structure with respect to the plate being thus permitted. Such an arrangement prevents expansions caused by heat from causing detrimental damage either to the structure to be protected or to the protective arrangement. Moreover, the fixing of the wire-netting to the structure at different points greatly reduces the heat transfer from the plate to the structure.

---

The present invention relates to the thermal protection of various structures and concerns more particularly the protection of those structures which undergo deformation of thermal or other origin.

Various methods of protecting structures exposed to heat have been developed, in particular for aeronautical engines. The protective panels heretofore used are either dense and made of refractory materials such as graphite, or ventilated or apertured, being for example of honeycomb material.

These various means of protection are poorly adapted to structures subject to possible deformation, particularly in the case of the expansion caused by thermal stresses. In fact, the heat flux received by the structure and the protection afforded is obviously not the same in the case of dense material as in the case of apertured material. A composite material of honeycomb nature certainly offers a spread of material sufficient to ensure good insulating properties, but the outer protective plate being rigidly connected to the ventilated intermediate element, the protection means as a whole does not conform well to the deformation of the structure to which it is fixed.

The thermal protection arrangement which is the subject of the invention belongs to the category of panel made of ventilated materials but it possesses a flexibility which is sufficient not to prevent the relative movements between the structure to be protected and the said panel, which are caused by thermal expansion.

The arrangement according to the invention essentially comprises a layer of expanded metal, such as a grille, which is sandwiched between the wall of a structure which is to be protected and a protective plate, which is possibly made of embossed or corrugated sheet metal. The fixing of the grille to these two respective surfaces is effected at different points so as to avoid any contact between the two surfaces through the medium of the fixing.

Spot welding is a very obvious method of fixing. Connection in this manner at scattered points permits good support of the assembly while allowing it a certain freedom of movement, the intermediate element being an element which is deformable to a high degree in its plane without damage.

The description which follows with reference to the accompanying drawings and which is given by way of non-limitative example will make the various features of the invention and the manner of carrying them into effect clearly understood, any arrangement appearing both from the text and from the drawings coming, of course, within the scope of the said invention, as defined by the appended claims.

FIGURE 1 is a transparent perspective view of a composite thermal protection panel according to the invention;

FIGURES 2 and 3 are sections showing the mounting of such a panel on a wall to be protected, the panel being combined with a polished sheet of anti-radiation foil;

FIGURE 4 is a section showing a method of fixing the assembly other than spot welding.

FIGURE 1 shows a sheet 1 of expanded metal constituted by filaments such as 1a and 1b which intersect in the "warp and weft" fashion of a fabric. Some of the intersections are welded either to the wall 2 to be protected at 3a, 3b, 3c . . . or to the protective plate 4 at 5a, 5b, 5c . . . Thus, the grille 1 is sandwiched between the wall 2 to be protected and the protective plate 4 with sufficient freedom to make possible the relative movements of the three elements, taken two by two. The surfaces 2 and 4 connected by the grille 1 of flexible metal filaments are largely independent in their respective planes.

The distribution of the weld points at the intersections of the grille over one or the other of the surfaces 2 and 4 must be such that it ensures this independence of movement in the best possible manner. This condition is fulfilled in the distribution of the weld points which is indicated in FIGURE 1. There may be filaments in the grille which are free from welds and which are fixed only by the intersections. In FIGURE 1, this is the case with one filament out of two.

The transference of the heat by conduction from the protective plate 4 of the wall 2 to be protected is rendered difficult because of the small areas of contact, which are of a punctiform nature, between the grille 1 and the two surfaces 2 and 4, the intermediate space being constituted by air, which affords good heat insulation.

According to another arrangement of the invention, the grille 1 may be fully or partly enveloped in an elastomer, if this heat insulator is preferred to air.

In FIGURES 2, 3 and 4, the structure to be protected is constituted by the wall 2 associated with another wall 6; the two walls forming the structure in this way are interconnected by linking elements 7.

It is sometimes necessary to prevent the propagation of heat not only by conduction but also by radiation. In this case, the protective arrangement 1 to 4 may be completed by an inner anti-radiation shield which is advantageously constituted by a sheet of polished metal foil 8. This shield may be interposed either between the grille 1 and the wall 2 to be protected, as shown in FIGURE 2, or between the protective plate 4 and the assembly composed of the grille 1 and the wall 2 to be protected, as shown in FIGURE 3. The first configuration according to FIGURE 2 is preferable because it avoids excess heating of the foil 8 by contact with the protective plate 4. If, however, the arrangement of FIGURE 3 is adopted, it is advantageous to use embossed or corrugated sheet metal for the said protective plate 4.

The fixing of the foil 8 may be effected by means of spot welds 9, either to the wall 2 (FIGURE 2) or to the grille 1 itself (FIGURE 3).

In the case of the assembly of FIGURE 3, the protective plate 4 is connected to the assembly consisting of the foil 8, the grille 1 and the wall 2 to be protected by means of a floating nut and bolt fixing. This fixing may moreover also be used in the case of the assembly of FIGURE 2 to replace the spot welds 9. Conversely, in the case of FIGURE 3, spot welds between the foil 8 and the plate 4 could be substituted for the floating nut and bolt fixing. The fixing shown in FIGURE 3 comprises a bolt 10 insulated from the wall 2 to be protected by an insulating washer 11. The diameter of the hole made in the foil 8, the grille 1 and the wall 2 to be protected being greater than that of the bolt 10, contact will be avoided between the bolt on the one hand and the protective panel and wall to be protected on the other hand. A cage 12, which permits the centering and the support of the nut 13 during mounting, may be fixed by spot welds 14 to the wall 2 to be protected. This method of fixing thus permits the relative movements of the structure to be protected 2, 6 with respect to the thermal protection panels 4, 8, 1.

The assembly of the composite panel and its fixing may be achieved with the aid of other methods of connection. For example, in FIGURE 4, the attachment of the composite panel is ensured by staples 15 and the fixing to the wall 2 by means of staples 16 which are reversed with respect to the first-mentioned staples.

In other forms of embodiment, it would be possible to use riveted or threaded studs, these, for example, having a broad flat head against which the elements to be fixed would be clamped by a flat nut of suitable shape.

The advantages of this protective arrangement reside in its lightness and in its small thickness dimension, while remaining effective and insensitive to deformation. The invention may be applied as a thermal protection means for all structures which must not be brought, without risk of damage or destruction, to excessive temperatures. The arrangement described may be used in particular for the protection of the structures or walls of aeronautical engines or compartments (combustion chamber, nozzle, thrust reverser, cockpit . . .).

It is moreover obvious that the invention is not limited to the forms of embodiment which have been explicitly described, but that it also covers those which can be obtained by the use of equivalent technical means, within the scope of the invention as defined by the appended claims.

What is claimed is:

1. A thermal protection arrangement for a structure to be protected against a heat source, said arrangement comprising a protective plate disposed between said heat source and said structure, and a substantially flat metallic wire-netting disposed between said plate and said structure and the wires of which intersect in the "warp and weft" fashion of a fabric, some of the intersections of some parallel wires being fixed to the structure and some of the intresections of some other wires parallel to said first wires being fixed to the plate and spaced from said first wires by at least one wire deprived of any fixations.

2. A thermal protection arrangement for a structure to be protected against a heat source, said arrangement comprising a protective plate disposed between said heat source and said structure, a substantially flat metallic wire-netting disposed between said plate and said structure and the wires of which intersect in the "warp and weft" fashion of a fabric, and an anti-radiation shield disposed between said structure and said wire-netting, some of the intersections of some parallel wires being fixed to the shield and some of the intersections of some other wires parallel to said first wires being fixed to the plate and spaced from said first wires by at least one wire deprived of any fixations, whereby relative movements of the structure with respect to the plate are possible.

3. A thermal protection arrangement for a structure to be protected against a heat source, said arrangement comprising a protective plate disposed between said heat source and said structure, a substantially flat metallic wire-netting disposed between said plate and said structure and the wires of which intersect in the "warp and weft" fashion of a fabric, and an anti-radiation shield disposed between said plate and said wire-netting, some of the intersections of some parallel wires being fixed to the shield and some of the intersections of some other wires parallel to said first wires being fixed to the structure and spaced from said first wires by at least one wire deprived of any fixations, whereby relative movements of the structure with respect to the plate are possible.

References Cited

UNITED STATES PATENTS

| 1,730,935 | 10/1929 | Hicks | 52—454 |
| 1,956,323 | 4/1934 | Gregg | 52—618 |
| 2,086,571 | 7/1937 | Novambere | 52—410 |
| 2,223,215 | 11/1940 | Kunz et al | 52—573 |
| 3,258,891 | 7/1966 | Haberbosch | 52—404 |
| 1,853,310 | 4/1932 | Land | 52—615 |
| 2,445,801 | 7/1948 | Partiot | 52—615 |

FOREIGN PATENTS 221,393  4/1910  Germany.

ALFRED G. PERHAM, *Primary Examiner.*

JAMES L. RIDGILL, Jr., *Assistant Examiner.*

U.S. Cl. X.R.

52—404, 615, 618